US 9,509,412 B2

(12) United States Patent
Tanaka et al.

(10) Patent No.: US 9,509,412 B2
(45) Date of Patent: Nov. 29, 2016

(54) OPTICAL COMMUNICATION SYSTEM, METHOD FOR CONTROLLING OPTICAL COMMUNICATION, AND OPTICAL TRANSMITTER

(71) Applicant: FUJITSU LIMITED, Kawasaki-shi, Kanagawa (JP)

(72) Inventors: Toshiki Tanaka, Setagaya (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/539,375

(22) Filed: Nov. 12, 2014

(65) Prior Publication Data

US 2015/0188638 A1 Jul. 2, 2015

(30) Foreign Application Priority Data

Dec. 27, 2013 (JP) ................................. 2013-271380

(51) Int. Cl.
*H04B 10/564* (2013.01)
*H04B 10/079* (2013.01)
*H04B 10/516* (2013.01)
*H04J 14/02* (2006.01)

(52) U.S. Cl.
CPC ........ *H04B 10/564* (2013.01); *H04B 10/0799* (2013.01); *H04B 10/516* (2013.01); *H04J 14/0272* (2013.01)

(58) Field of Classification Search
None
See application file for complete search history.

(56) References Cited

U.S. PATENT DOCUMENTS

| | | | |
|---|---|---|---|
| 2005/0111843 A1 | 5/2005 | Takeuchi et al. | |
| 2009/0196602 A1 | 8/2009 | Saunders et al. | |
| 2010/0239259 A1 | 9/2010 | Forghieri et al. | |
| 2012/0106971 A1* | 5/2012 | Sugaya | H04J 14/0279 398/97 |

FOREIGN PATENT DOCUMENTS

| | | |
|---|---|---|
| EP | 2448153 A1 | 5/2012 |
| JP | 2005-136772 | 5/2005 |
| JP | 2010-278684 | 12/2010 |
| WO | 2008032381 | 3/2008 |

OTHER PUBLICATIONS

EESR—Extended European Search Report mailed on May 20, 2015 for corresponding European Patent Application No. 14194468.6.

* cited by examiner

*Primary Examiner* — Darren E Wolf
(74) *Attorney, Agent, or Firm* — Fujitsu Patent Center (57) ABSTRACT

An optical communication system includes an optical transmitter that sends an optical signal; and an optical receiver that receives the optical signal. The optical transmitter controls a transmission rate of the optical signal to a first transmission rate corresponding to first reception light power lower than target reception light power of the optical receiver in response to transmission light power control for the optical signal corresponding to the target reception light power.

15 Claims, 8 Drawing Sheets

OPTICAL COMMUNICATION SYSTEM, METHOD FOR CONTROLLING OPTICAL COMMUNICATION, AND OPTICAL TRANSMITTER

CROSS-REFERENCE TO RELATED APPLICATION

This application is based upon and claims the benefit of priority of the prior Japanese Patent application No. 2013-271380, filed on Dec. 27, 2013, the entire contents of which are incorporated herein by reference.

FIELD

The embodiment discussed herein is directed to an optical communication system, a method for controlling optical communication, and an optical transmitter.

BACKGROUND

A typical optical communication system includes an optical transmitter that sends an optical signal and an optical receiver that receives the optical signal. In such an optical communication system, an optical signal is attenuated while traveling through a transmission path that connects the optical transmitter to the optical receiver. For the above, when the optical transmitter is started, the optical communication system controls the power of an optical signal to be sent from the optical transmitter such that the power of the optical signal when being received at the optical receiver is in a predetermined level. This control gradually increases the power of an optical signal from adequately small power in order to prevent an optical signal having power exceeding the maximum receivable power of the optical receiver from entering the optical receiver.

A mobile communication system increases, when a mobile device issues a connection request to a base station device, transmission electric power of a wireless signal by decreasing the number of subcarriers used for the wireless signal.

Another mobile communication system allocates common data to multiple subcarriers that are relatively low in communication quality to accomplish mobile communication.

[Patent Literature 1] Japanese Laid-open patent Publication No. 2005-136772
[Patent Literature 2] Japanese Laid-open patent Publication No. 2010-278684
[Patent Literature 3] WO2008/032381

SUMMARY

Unfortunately, the above optical communication system takes relatively long time to establish optical communication between the optical transmitter and the optical receiver.

As one aspect, an optical communication system includes: an optical transmitter that sends an optical signal; and an optical receiver that receives the optical signal. The optical transmitter controls a transmission rate of the optical signal to a first transmission rate corresponding to first reception light power lower than a target reception light power of the optical receiver in response to transmission light power control for the optical signal corresponding to the target reception light power.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, an embodiment of the present invention will now be described with reference to the accompanying drawings. The following embodiment is exemplary, so there is no intention to exclude application of various modifications and techniques not suggested in the following description to the embodiment. Throughout accompanying drawings of the embodiment, like reference numbers designate the same or substantially identical parts and elements unless change and modification are otherwise specified.

Figure 1:
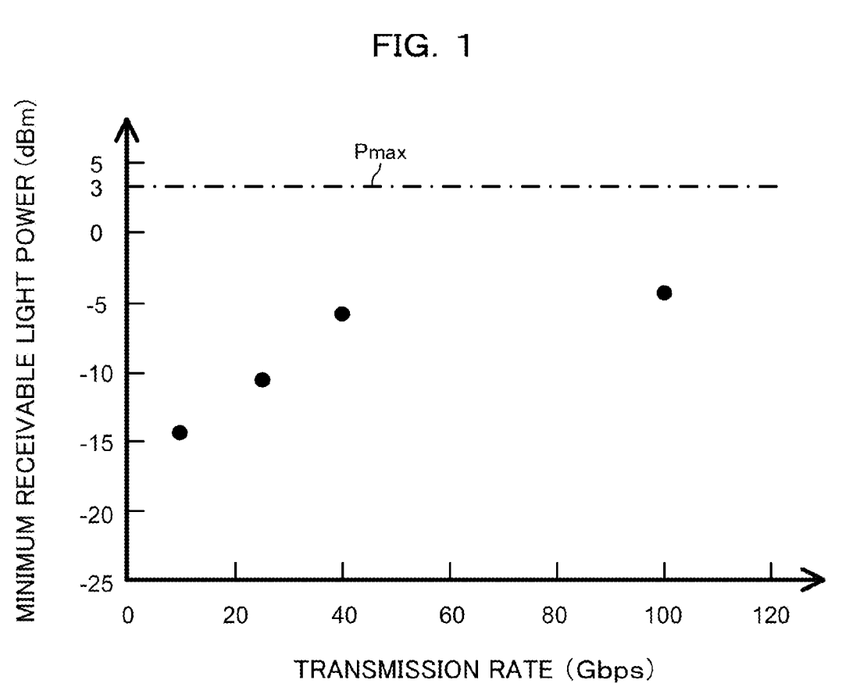
FIG. 1 is a graph depicting an example of a change in minimum receivable light power at respective transmission rates in a related art.

As illustrated in FIG. 1, the maximum receivable light power Pmax of an optical receiver depends on optical components such as a light receiving device and hardly changes with a change in transmission rate. The maximum receivable light power Pmax represents the maximum value of the power of an optical signal that an optical receiver can receive. In the example of FIG. 1, the maximum receivable light power Pmax is 3 dBm.

A transmission rate is the number of bits transmitted per second, and represents the product of a baud rate and the number of bits expressed by a single modulation symbol. A baud rate is the number of modulation symbols transmitted per second. This means that, in cases where the common number of bits represented by a single modulation symbol is constant, the transmission rate comes to be larger as increase in the baud rate. The number of different bit strings that individual modulation symbol can represent is called a multilevel degree. Alternatively, the term of a multilevel degree may mean the number of bits represented by a single modulation symbol.

The minimum receivable light power of an optical receiver represented by the black circles in FIG. 1 increases as increase in the transmission rate. The minimum receivable light power represents the minimum value of power of an optical signal that an optical receiver can receive.

Here, in controlling the power of an optical signal that an optical transmitter is to send, the power of the optical signal gradually increases from adequately small power in order to avoid a circumstance an optical signal having power exceeding the maximum receivable light power enters an optical receiver. This control is also called transmission light power control. Accordingly, as the transmission rate of an optical signal comes to be higher, it takes a longer time until the power of an optical signal that enters the optical receiver reaches the minimum receivable light power. This may take a longer time to establish optical communication between the optical transmitter and the optical receiver. To resolve this inconvenience, the present embodiment intends to shorten the time taken to establish optical communication.

(Overview)

The optical communication system of the first embodiment includes an optical transmitter that sends an optical signal; and an optical receiver that receives the optical signal. The optical transmitter controls a transmission rate of the optical signal to a first transmission rate corresponding to first reception light power lower than target reception light power of the optical receiver in response to transmission light power control for the optical signal corresponding to the target reception light power.

This can reduce the time that the power of an optical signal entering the optical receiver takes to reach the power of the optical signal receivable by the optical receiver. Thereby, the time taken to establish the optical communication between the optical transmitter and the optical receiver can be shortened. In other words, the optical communication between the optical transmitter and the optical receiver can be rapidly established.

Hereinafter, the optical communication system of the first embodiment will now be detailed.

(Configuration)

Figure 2:
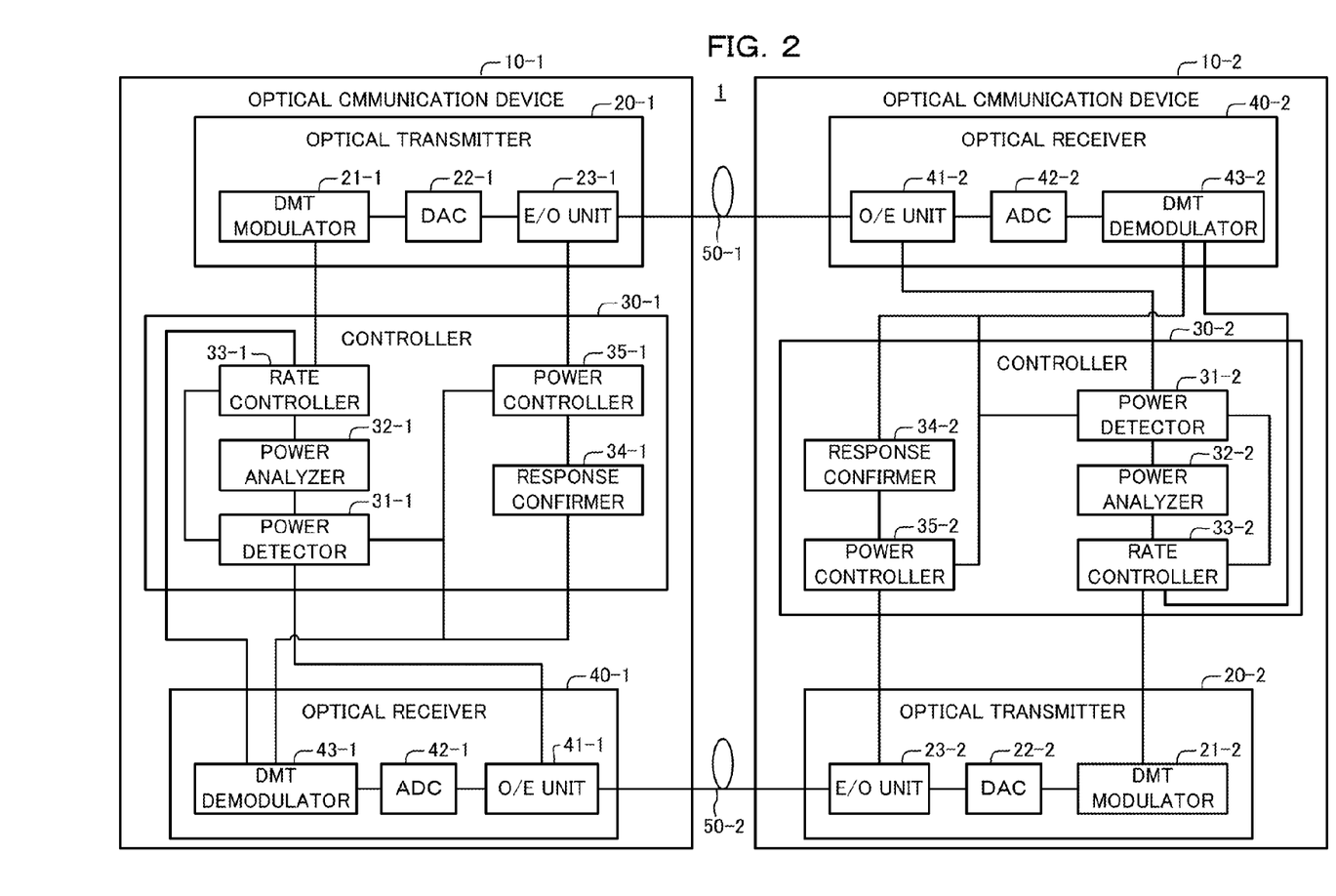
FIG. 2 is a block diagram schematically illustrating an example of the configuration of an optical communication system according to a first embodiment.

As illustrated in FIG. 2, the optical communication system 1 according to the first embodiment includes an optical communication device 10-1 and a counterpart optical communication device 10-2. The optical communication device 10-1 and the optical communication device 10-2 are connected to each other via transmission paths 50-1 and 50-2.

The transmission paths 50-1 and 50-2 are exemplarily optical fibers. In the first embodiment, the transmission paths 50-1 and 50-2 are collectively included in a single optical communication cable. Alternatively, the transmission paths 50-1 and 50-2 may be included in respective different optical communication cables. In the first embodiment, the transmission path 50-1 sends an optical signal from the optical communication device 10-1 to the optical communication device 10-2 while the transmission path 50-2 sends an optical signal from the optical communication device 10-2 to the optical communication device 10-1.

The optical communication system 1 may further include non-illustrated amplifiers that amplify optical signals on the transmission paths 50-1 and 50-2.

The optical communication system 1 exemplarily performs optical communication in a multicarrier modulation scheme, which specifically is the Discrete Multitone (DMT) modulation scheme in the first embodiment. The DMT modulation scheme amplitude-modulates each of multiple subcarriers contained in an optical signal. Such multiple subcarriers are generated by dividing an optical signal in a frequency domain.

Alternatively, the optical communication system 1 may adopt a different modulation scheme from the DMT modulation scheme. Examples of an alternative modulation scheme may phase-modulate each of multiple subcarriers contained in an optical signal or may phase-amplitude-modulate each of multiple subcarriers contained in an optical signal.

As alternative to the multicarrier modulation scheme, the optical communication system 1 may adopt a single carrier modulation scheme. Further alternatively, the optical communication system 1 may carry out optical communication according to the Wavelength Division Multiplexing (WDM) scheme.

(Configuration: Optical Communication Device)

The optical communication device 10-$i$ exemplarily includes an optical transmitter 20-$i$, a controller 30-$i$, and an optical receiver 40-$i$, where i represents 1 or 2.

The optical transmitter 20-$i$ exemplarily includes a DMT modulator 21-$i$, a Digital to Analog Converter (DAC) 22-$i$ and an Electrical to Optical (E/O) unit 23-$i$.

The DMT modulator 21-$i$ attaches an error correction code to data to be sent, which is in the form of an electric signal. Examples of data to be sent are data that the optical communication device 10-$i$ retains in advance and data input into the optical communication device 10-$i$ from the exterior of the optical communication device 10-$i$. Examples of an error correction code is a block code and a convolutional code.

The DMT modulator 21-$i$ generates a driving signal based on the data to be sent after attached thereto the error correction code such that the E/O unit 23-$i$ can carry out modulation according to the DMT modulation scheme.

In the first embodiment, the DMT modulator 21-$i$ sets each subcarrier included in a basic subcarrier group to be a used subcarrier or an unused subcarrier in obedience to an instruction from the controller 30-$i$. In the first embodiment, the basic subcarrier group includes all the subcarriers that the E/O unit 23-$i$ can generate.

Furthermore, the DMT modulator 21-$i$ sets the multilevel degree of modulation of each of the subcarriers set to be the used subcarriers in obedience to the instruction from the controller 30-$i$.

In the first embodiment, the driving signal is generated such that an optical signal after being modulated in the E/O unit 23-$i$ contains the subcarriers set to be the used subcarriers but does not contain the subcarriers set to be the unused subcarriers. The driving signal is also generated such that subcarriers contained in an optical signal after being modulated in the E/O unit 23-$i$ are modulated at the multilevel degrees set, respectively.

The controller 30-$i$ will now be detailed below.

The DAC 22-$i$ converts the driving signal output from the DMT modulator 21-$i$ from a digital signal to an analog signal. The DAC 22-$i$ outputs the converted driving signal to the E/O unit 23-$i$.

The E/O unit 23-$i$ includes a light source and a light modulator, which are however not illustrated. The light source emits laser light. Examples of the light source is a semiconductor laser, such as a Distributed Feedback Laser (DFL), and a Laser Diode (LD). The optical modulator modulates the laser light emitted from the light source on the basis of the driving signals output from the DAC 22-$i$.

As the above, the E/O unit 23-$i$ of the first embodiment carries out external modulation. Alternatively, the E/O unit 23-$i$ may carry out direct modulation. The conversion from an electric signal to an optical signal by the E/O unit 23-$i$ is also referred to as electrophotonic conversion.

Figure 3:
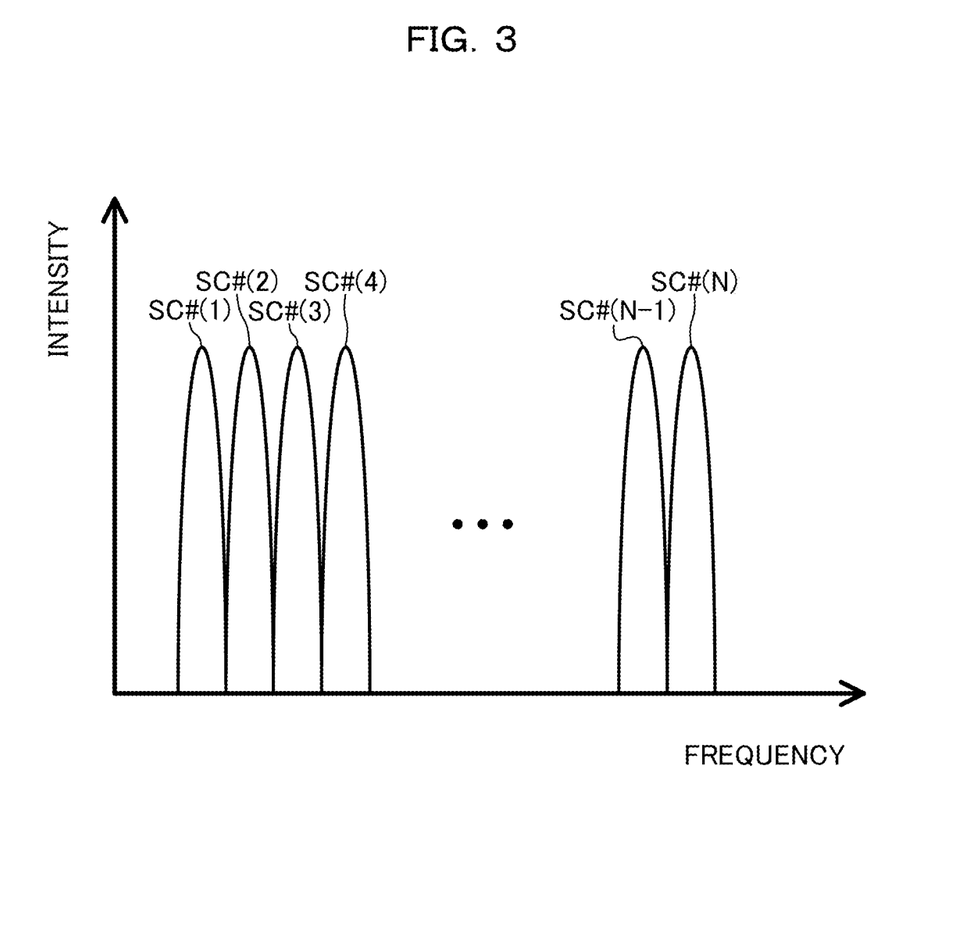
FIG. 3 is a graph depicting an example of subcarriers contained in an optical signal to be sent by an optical transmitter of FIG. 2.

As illustrated in FIG. 3, the optical signal after being modulated by the E/O unit 23-$i$ includes multiple subcarriers SC#(1) through SC#(N), where N represents an integer equal to or more than two. As described above, the subcarriers contained in an optical signal after being modulated are the subcarriers set to be the used subcarriers by the controller 30-$i$.

The E/O unit 23-$i$ illustrated in FIG. 2 outputs the optical signal after undergoing the modulation to the transmission path 50-$i$. The transmission path 50-$i$ propagates the optical signal output from the optical communication device 10-$i$ to an optical communication device 10-$j$ where $j=2$ when $i=1$ and $j=1$ when $i=2$.

The optical receiver 40-$i$ exemplarily includes an Optical to Electrical (O/E) unit 41-$i$, an Analog to Digital Converter (ADC) 42-$i$, and a DMT demodulator 43-$i$.

The O/E unit 41-$i$ receives, through the transmission path 50-$j$, an optical signal output from the optical communication device 10-$j$.

The O/E unit 41-$i$ includes a light source and a light detector, which are however not illustrated. The light source emits local oscillation light that is to be used by the light detector. Examples of the light source is a semiconductor laser, such as a Distributed Feedback Laser (DFL), and a Laser Diode (LD). The light detector detects an input optical signal on the basis of the local oscillation light emitted from the light source. The O/E unit 41-$i$ outputs the result of the detection serving as the received data to the ADC 42-$i$. The received data is in the form of an electric signal.

As the above, the O/E unit 41-$i$ converts the input optical signal into an electric signal. The conversion from an optical signal to an electric signal is referred to as photoelectric conversion.

The ADC 42-$i$ converts the received data output from the O/E unit 41-$i$ from an analog signal to a digital signal. The ADC 42-$i$ outputs the received data after being converted to the DMT demodulator 43-$i$.

The DMT demodulator 43-$i$ performs demodulation on the received data after undergoing the conversion by the ADC 42-$i$ in a DMT demodulation scheme compatible with the DMT modulation scheme.

In the first embodiment, the DMT demodulator 43-$i$ sets each subcarrier included in a basic subcarrier group to be a used subcarrier or an unused subcarrier in obedience to an instruction from the controller 30-$i$. Furthermore, the DMT demodulator 43-$i$ sets a multilevel degree of demodulation for each subcarrier set to be the used subcarrier in obedience to an instruction from the controller 30-$i$.

In the first embodiment, the demodulation is carried out on the basis of the subcarriers set to be the used subcarriers and the multilevel degrees set for the respective subcarriers.

The DMT demodulator 43-$i$ carries out error correction on the received data after being demodulated. In the first embodiment, the DMT demodulator 43-$i$ carries out error correction based on an error correction code attached to the received data. For example, the received data after undergoing the error correction may be retained in the optical communication device 10-$i$ or may be output to the exterior of the optical communication device 10-$i$.

Next, the controller 30-$i$ will now be detailed.

In the first embodiment, the optical communication system 1 controls an optical signal sent through the transmission path 50-1 and an optical signal sent through the transmission path 50-2 in the same manner. The function related to controlling over an optical signal that is to be sent through the transmission path 50-1 among the functions of the controller 30-1 of the optical communication device 10-1 is same as the function related to controlling over an optical signal that is to be sent through the transmission path 50-2 among the functions of the controller 30-2 of the optical communication device 10-2. Likewise, the function related to controlling over an optical signal that is to be sent through the transmission path 50-2 among the functions of the controller 30-1 of the optical communication device 10-1 is same as the function related to controlling over an optical signal that is to be sent through the transmission path 50-1 among the functions of the controller 30-2 of the optical communication device 10-2.

The controller 30-$i$ exemplarily includes a power detector 31-$i$, a power analyzer 32-$i$, a rate controller 33-$i$, a response confirmer 34-$i$, and a power controller 35-$i$.

The power detector 31-$i$ detects received light power, which corresponds to the power of an optical signal that has been output from the optical communication device 10-$j$ and that has been input into the O/E unit 41-$i$ through the transmission path 50-$j$ in the first embodiment. The power detector 31-$i$ of the first embodiment includes a non-illustrated light receiving element, into which an optical signal input into the O/E unit 41-$i$ is input. In the first embodiment, the received light power is expressed in the largeness of the electric current that the light receiving element outputs and may alternatively be expressed in the amplitude of the input optical signal.

The power analyzer 32-$i$ obtains a signal to noise ratio of an optical signal that has been output from the optical transmitter 20-$j$ and that has been input into the optical receiver 40-$i$ through the transmission path 50-$j$. For example, the power analyzer 32-$i$ obtains the signal to noise ratio of each of the subcarriers contained in the optical signal. A signal to noise ratio is abbreviated to an SNR.

The rate controller 33-$i$ controls the transmission rate of an optical signal that is to be sent from the optical transmitter 20-$i$. In the first embodiment, the rate controller 33-$i$ changes the transmission rate by causing the DMT modulator 21-$i$ to change subcarriers that are set to be used subcarriers or unused subcarriers and also modify the multilevel degrees of modulation set for the respective subcarriers. Furthermore, the rate controller 33-$i$ causes the DMT demodulator 43-$i$ to change subcarriers set to be used subcarriers or unused subcarriers and also modify the multilevel degrees of demodulation set for the respective subcarriers.

The response confirmer 34-$i$ controls the optical transmitter 20-$i$ to send a control signal and determines whether the optical receiver 40-$i$ receives the control signal. In the first embodiment, a control signal is a first response signal, a second response signal, a third response signal, or a confirmation signal, which will be described below.

The power controller 35-$i$ controls transmission light power of the E/O unit 23-$i$. Specifically, the transmission light power corresponds to the power of an optical signal to be output from the E/O unit 23-$i$. For example, the transmission light power may be expressed in an amplitude of the optical signal to be output and may alternatively be expressed in electric power to be consumed to output the optical signal.

Here, the controller 30-$i$ will now be further detailed.

The controller 30-$i$ of the first embodiment performs, in sequence, the transmission light power control and multilevel degree determination control. The transmission light power control adjusts the power of an optical signal to be output from the optical transmitter 20-$i$ such that the power of the optical signal when being input into the counterpart optical receiver 40-$j$ is equal to or more than the minimum receivable light power.

The power of the optical signal to be input into the counterpart optical receiver 40-$j$ being equal to or more than the power that allows the optical receiver 40-$j$ to receive the optical signal is one of the examples of successfully establishing optical communication between the optical transmitter 20-$i$ and the optical receiver 40-$j$.

For example, the capability of the optical receiver 40-$j$ of demodulating an optical signal is one of the examples of the optical receiver 40-$j$ being capable of receiving an optical signal. A bit error rate in the error correction that the optical receiver 40-$j$ performs on the received data after being demodulated being equal to or less than a threshold is one of the examples of the optical receiver 40-$j$ being capable of receiving an optical signal.

The multilevel degree determination control exemplarily determines the multilevel degree of modulation of each subcarrier contained in an optical signal to be output from the optical transmitter 20-$i$ on the basis of the SNR of an optical signal received by the optical receiver 40-$j$.

First of all, description will now be made in relation to a function of the controllers 30-1 and 30-2 for transmitting power control on an optical signal to be sent through the transmission path 50-1.

When the optical transmitter 20-1 is started, the power controller 35-1 sets the transmission light power to a certain initial power P0, which is lower than the maximum receivable light power of the optical receiver 40-2.

Furthermore, when the optical transmitter 20-1 is started, the rate controller 33-1 controls the transmission rate of an optical signal to be output from the optical transmitter 20-1 to the first transmission rate.

In the first embodiment, controlling the transmission rate to the first transmission rate is accomplished by setting the subcarriers included in a power-controlling subcarrier group to be used subcarriers while setting the remaining subcarriers to unused subcarriers.

Figure 4:
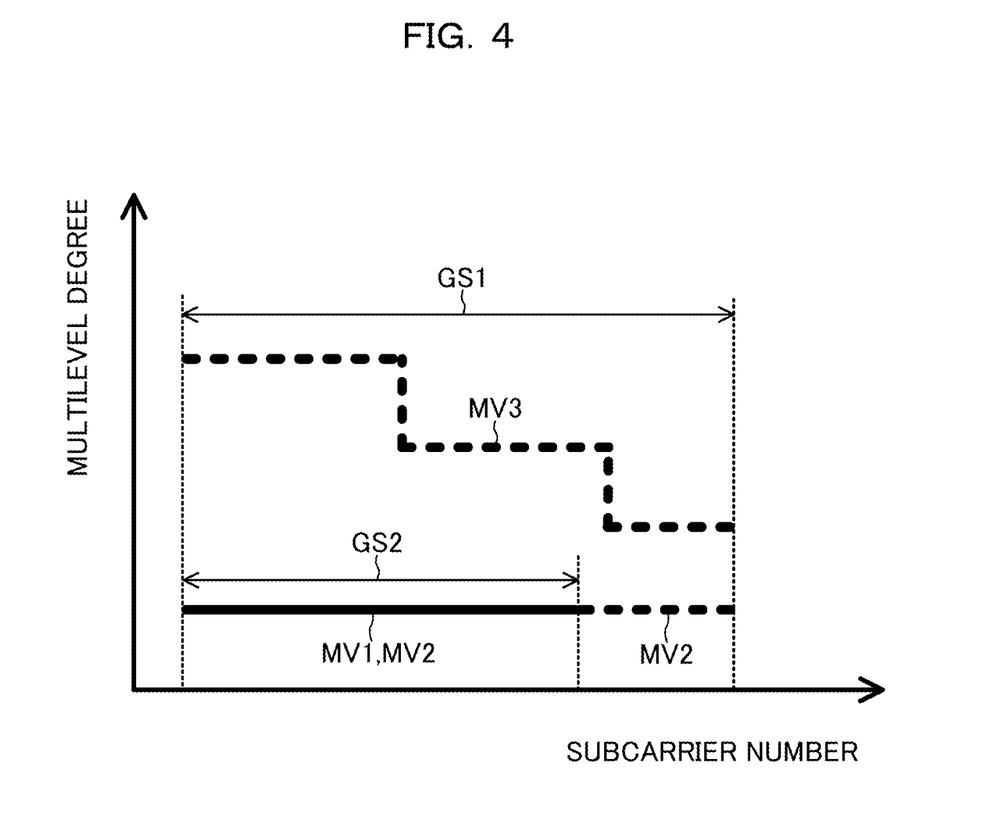
FIG. 4 is a graph depicting an example of multilevel degrees of respective subcarriers contained in an optical signal to be sent by an optical transmitter of FIG. 2.

As illustrated in FIG. 4, the power-controlling subcarrier group GS2 corresponds to the remainder of excluding a certain number of subcarriers from the higher frequency end from the basic subcarrier group GS1. This means that the basic subcarrier group GS1 includes subcarriers each having a high frequency than frequencies of the subcarriers included in the power-controlling subcarrier group GS2. Besides, the number of subcarriers included in the power-controlling subcarrier group GS2 is less than that included in the basic subcarrier group GS1. Each subcarrier is identified with a subcarrier number. In the first embodiment, a larger subcarrier number is associated with a subcarrier having a higher frequency.

Furthermore, controlling the transmission rate to the first transmission rate is accomplished by the multilevel degrees of modulation of the subcarriers set to be the used subcarriers to a certain multilevel degree for power control. In the first embodiment, as illustrated in FIG. 4, the multilevel degree MV1 for power control is lower than a multilevel degree MV3 determined in the multilevel degree determination control. For example, the multilevel degree for power control is four, which means a single modulation symbol represents two bits.

The rate controller 33-2 illustrated in FIG. 2 instructs the DMT demodulator 43-2 to set subcarriers included in the power-controlling subcarrier group to be used subcarriers while set the remaining subcarriers to be unused subcarriers when the optical receiver 40-2 is started. Furthermore, the rate controller 33-2 instructs the DMT demodulator 43-2 to set, when the optical receiver 40-2 is started, the multilevel degrees of demodulation of the subcarriers set to be the used subcarriers to be the multilevel degree for power control.

The power analyzer 32-2 obtains, in cases where the reception light power detected by the power detector 31-1 is equal to or larger than a first standard, the SNRs of the respective subcarriers contained in an optical signal received by the optical receiver 40-2. The first standard is equal to or larger than the minimum receivable light power of an optical signal having a first transmission rate. For example, the first standard is the minimum receivable light power of an optical signal having a first transmission rate. The minimum receivable light power of an optical signal having a first transmission rate is an example of first reception light power.

The power analyzer 32-2 retains data that associates an SNR with a second increment in advance, and determines the second increment using the obtained SNR and the retained data. For example, the power analyzer 32-2 may determine the second increment using the average of SNRs of the subcarriers.

The response confirmer 34-2 controls the optical transmitter 20-2 to send a first response signal containing the second increment determined by the power analyzer 32-2.

In cases where the response confirmer 34-1 does not determine that the first response signal has been received within a certain standby time, the power controller 35-1 increases the transmission light power by a certain first increment. Accordingly, the power controller 35-1 stepwise increases the transmission light power until receiving the first response signal.

In cases where the response confirmer 34-1 determines that the first response signal has been received within the standby time, the power controller 35-1 increases the transmission light power by the second increment contained in the first response signal.

In cases where the response confirmer 34-1 determines that the first response signal has been received within the standby time, the response confirmer 34-1 controls the optical transmitter 20-1 to send a confirmation signal. The confirmation signal confirms that the power of an optical signal to be output from the optical transmitter 20-1 has been adjusted such that the optical signal when being input into the optical receiver 40-2 has power equal to or more than the power of the optical signal receivable by the optical receiver 40-2. For example, the confirmation signal represents a predetermined information.

In cases where the response confirmer 34-2 determines that the confirmation signal has been received, the response confirmer 34-2 controls the optical transmitter 20-2 to send a second response signal, which represents that the confirmation signal has been received.

In the first embodiment, in cases where the response confirmer 34-1 determines that the second response signal has been received, the controller 30-1 completes the transmission light power control. Besides, in the first embodiment, upon the transmission of the second response signal, the controller 30-2 completes the transmission light power control.

Next, description will now be made in relation to the functions of the controllers 30-1, 30-2 for the multilevel degree determination control on optical signals to be sent through the transmission path 50-1.

After the transmission light power control is completed, the rate controller 33-1 controls the transmission rate of an optical signal to be output from the optical transmitter 20-1 to a third transmission rate, which is larger than the first transmission rate. The minimum receivable light power of an optical signal having the third transmission rate is an example of second reception light power.

In the first embodiment, controlling the transmission rate to the third transmission rate is accomplished by setting the subcarriers contained in a transmitting subcarrier group to used subcarriers and setting the remaining subcarriers to unused subcarriers.

The transmitting subcarrier group of the first embodiment is the same as the basic subcarrier group. Accordingly, the number of subcarriers included in the transmitting subcarrier group is more than the number of subcarriers included in the power-controlling subcarrier group.

Furthermore, controlling the transmission rate to the third transmission rate is accomplished by the multilevel degrees of modulation of the subcarriers set to be the used subcarriers to a certain multilevel degree for multilevel degree control. In the first embodiment, as illustrated in FIG. 4, the multilevel degree MV2 for multilevel degree control is lower than a multilevel degree MV3 determined in the multilevel degree determination control. The multilevel degree MV2 for multilevel degree control of the first embodiment has the same value as the multilevel degree MV1 for power control.

After the transmission light power control is completed, the rate controller 33-2 illustrated in FIG. 2 instructs the DMT demodulator 43-2 to set the subcarriers included in the transmitting subcarrier group to be used subcarriers while set the remaining subcarriers to be unused subcarriers. Furthermore, after the transmitting power control is completed, the rate controller 33-2 instructs the DMT demodulator 43-2 to set the multilevel degree of demodulation for each subcarrier set to a used subcarrier to be the multilevel degree for multilevel degree control.

Figure 5:
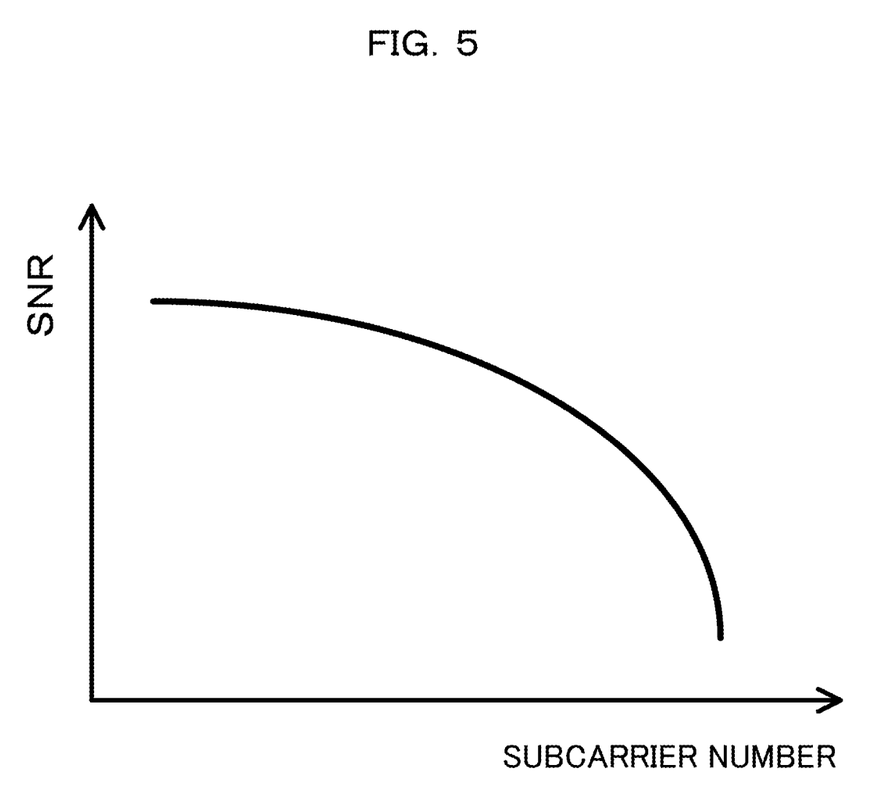
FIG. 5 is a graph depicting an example of signal to noise ratios of respective subcarriers contained in an optical signal received by an optical receiver of FIG. 2.

The power analyzer 32-2 obtains the NSR of each subcarrier contained in an optical signal received by the optical receiver 40-2. For example, an SNR of each subcarrier decreases as the subcarrier has a higher frequency, as depicted in FIG. 5.

The power analyzer 32-2 illustrated in FIG. 2 retains data that associates an SNR with a multilevel degree in advance, and determines the multilevel degree of each subcarrier using the obtained SNR and the retained data. In the first embodiment, the multilevel degree MV3 determined by the power analyzer 32-2 is higher than the multilevel degree MV1 for power control and the multilevel degree MV2 for multilevel degree control, as depicted in FIG. 4. Furthermore, the power analyzer 32-2 determines a multilevel degree that increases as the SNR increases.

The response confirmer 34-2 illustrated in FIG. 2 controls the optical transmitter 20-2 to send a third response signal containing the multilevel degree of each subcarrier determined by the power analyzer 32-2.

In cases where the response confirmer 34-1 determines that the third response signal has been received, the rate controller 33-1 instructs the optical transmitter 20-1 to set the multilevel degrees of modulation of the subcarriers set to be the used subcarriers to multilevel degrees included in the third response signal. This controls the transmission rate of an optical signal to be sent from the optical transmitter 20-1 to a second transmission rate, which is larger than the third transmission rate in the first embodiment. The minimum receivable light power of an optical signal having the second transmission rate is an example of target reception light power.

After the third response signal is sent, the rate controller 33-2 instructs the DMT demodulator 43-2 to set the multilevel degrees of demodulation of the subcarriers set to be the used subcarriers to the determined multilevel degrees.

In the first embodiment, when the rate controller 33-1 sets the multilevel degrees of modulation to one contained in the third response signal, the controller 30-1 completes the multilevel degree determination control. In the first embodiment, when the rate controller 33-2 sets the multilevel degrees of demodulation to the determined multilevel degrees, the controller 30-2 completes the multilevel degree determination control.

After the multilevel degree determination control is completed, the optical communication device 10-$i$ sends an optical signal to the optical communication device 10-$j$ through the transmission path 50-$j$ at the second transmission rate. An example of an optical signal represents user data.

The functions of the optical communication device 10-$i$ except for the E/O unit 23-$i$, the power detector 31-$i$, and the O/E unit 41-$i$ may be achieved with a Large Scale Integration (LSI) or a programmable logic circuit device, such as a Programmable Logic Device (PLD) or an Field-Programmable Gate Array (FPGA).

The optical communication device 10-$i$ may replace the DMT modulator 21-$i$, the controller 30-$i$, and the DMT demodulator 43-$i$ with the combination of a processor and a memory. With this configuration, the processor may execute a program recorded (in other words, stored) in the memory to thereby achieve the functions of the DMT modulator 21-$i$, the controller 30-$i$, and the DMT demodulator 43-$i$. An example of the processor is a Digital Signal Processor (DSP).

(Operation)

Next, description will now be made in relation to the operation of the optical communication system 1.

Figure 6:
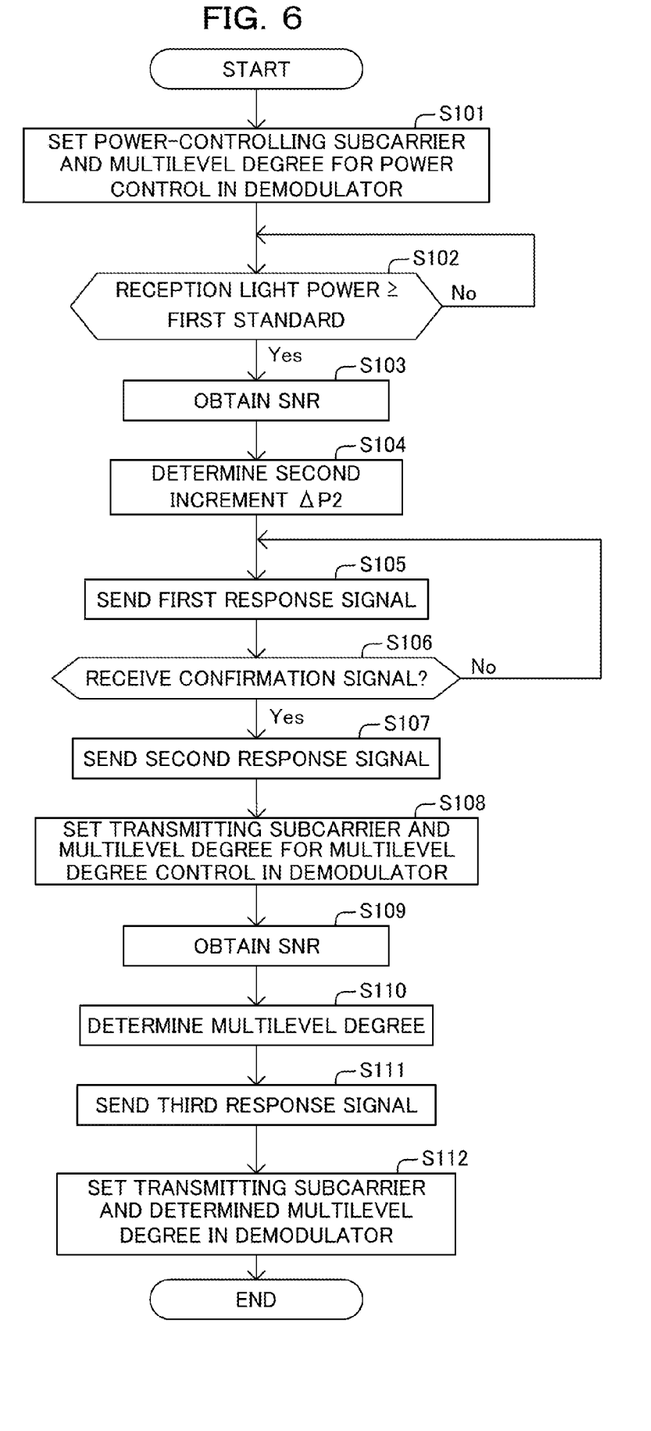
FIG. 6 is a flow diagram illustrating an example of a succession of procedural steps performed by a controller of FIG. 2.

When the optical receiver 40-2 is started, the optical communication device 10-2 carries out the process detailed in FIG. 6 on an optical signal to be sent through the transmission path 50-1.

Figure 7:
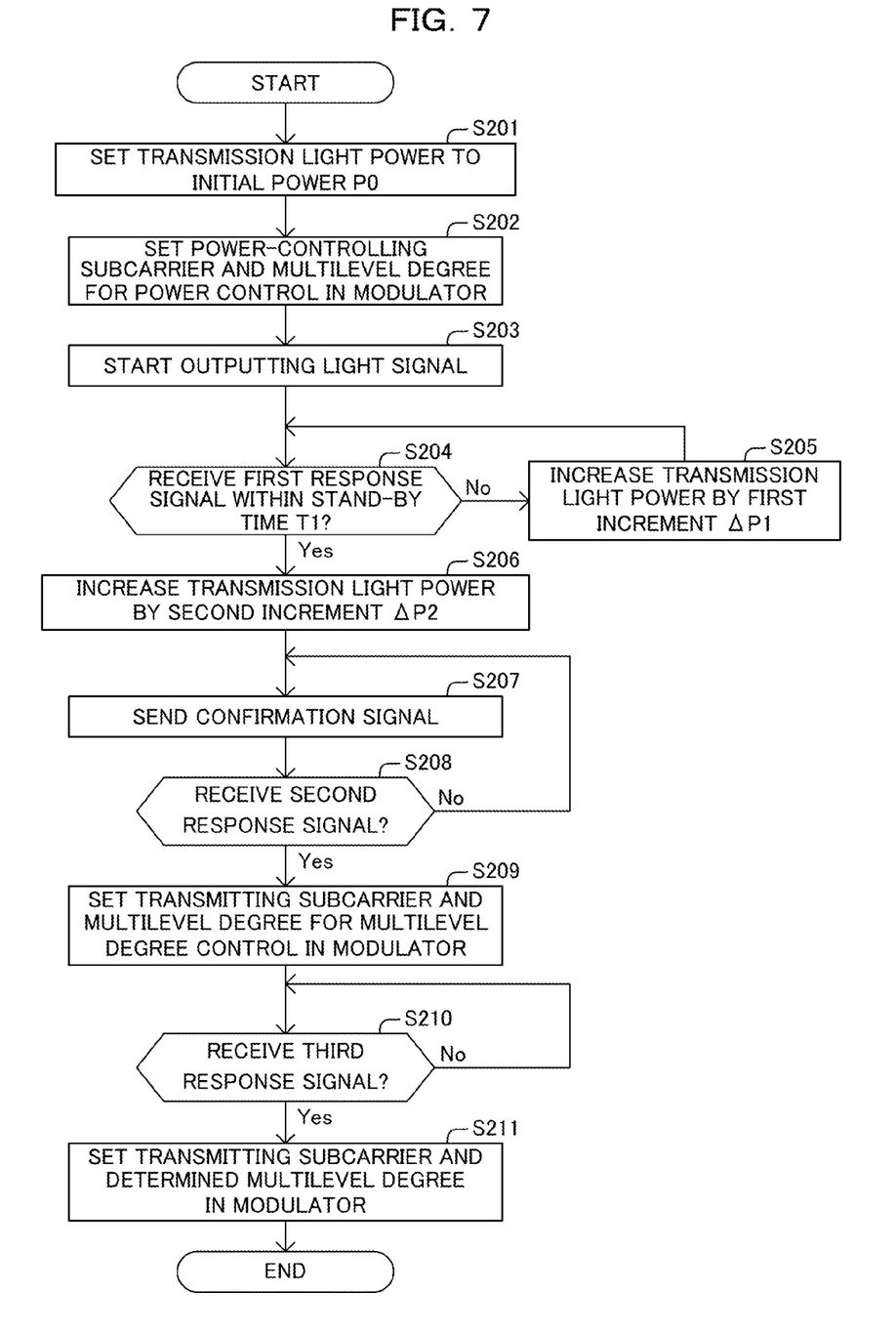
FIG. 7 is a flow diagram illustrating an example of a succession of procedural steps performed by a controller of FIG. 2.

Furthermore, when the optical transmitter 20-1 is started, the optical communication device 10-1 carries out the process detailed in FIG. 7 on an optical signal to be sent through the transmission path 50-1.

Likewise, when the optical receiver 40-1 is started, the optical communication device 10-1 carries out the process detailed in FIG. 6 on an optical signal to be sent through the transmission path 50-2.

Furthermore, when the optical transmitter 20-2 is started, the optical communication device 10-2 carries out the process detailed in FIG. 7 on an optical signal to be sent through the transmission path 50-2.

As the above, since control on an optical signal to be sent through the transmission path 50-1 is the same as control on an optical signal to be sent through the transmission path 50-2, the following description will focus on the control on an optical signal to be sent through the transmission path 50-1.

Figure 8:
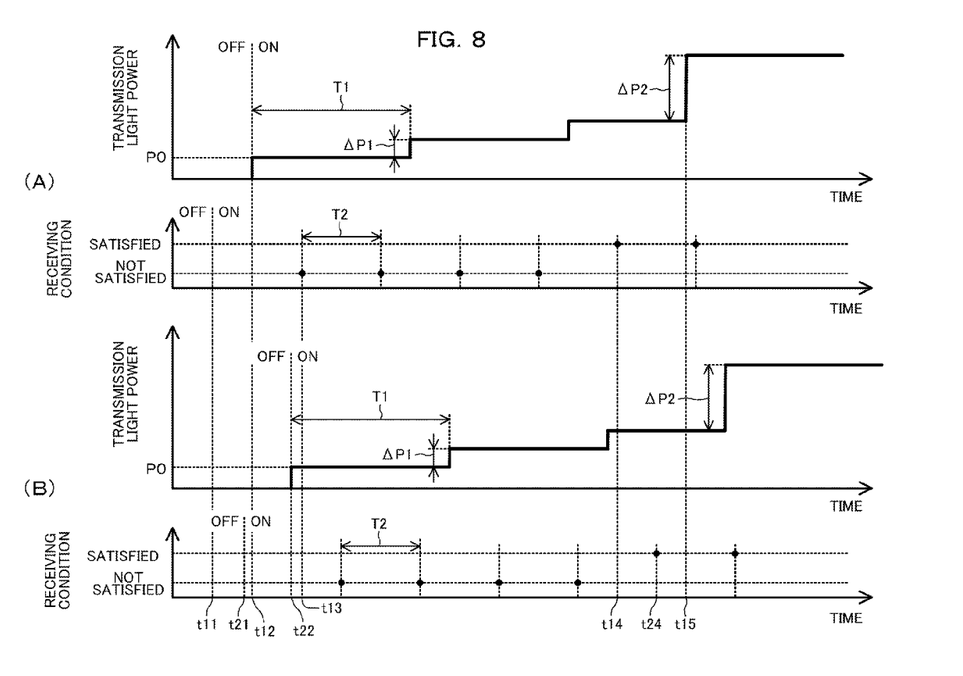
FIG. 8 is a time chart illustrating timings at which the optical communication system of FIG. 2 changes transmission light power.

First of all, the optical receiver 40-2 is assumed to be started at the time point t11 as illustrated in FIG. 8(A). In this case, the controller 30-2 instructs the DMT demodulator 43-2 to set the subcarriers included in the power-controlling subcarrier group to be used subcarriers and set the remaining subcarriers to be unused subcarriers. The controller 30-2 further instructs the DMT demodulator 43-2 to set the multilevel degrees of demodulation of the subcarriers set to be the used subcarriers to the multilevel degree for power control (step S101 of FIG. 6).

The controller 30-2 determines whether the reception light power of an optical signal input into the optical receiver 40-2 is equal to or more than the first standard each time a determination period T2 elapses (step S102 of FIG. 6). In the first embodiment, the condition that the reception light power is equal to or more than the first standard is also referred to as a reception condition.

After that, as illustrated in FIG. 8(A), the optical transmitter 20-1 is assumed to be started at the time point t12. In this case, the controller 30-1 sets the transmission light power of an optical signal to be output from the optical transmitter 20-1 to the initial power P0 (step S201 of FIG. 7).

Next, the controller 30-1 instructs the DMT modulator 21-1 to set the subcarriers contained in the power-controlling subcarrier group to be used subcarriers while set the remaining subcarriers to be unused subcarriers. In addition, the controller 30-1 instructs the DMT modulator 21-1 to set the multilevel degrees of modulation of the subcarriers set to be the used subcarriers to be the multilevel degree for power control (step S202 of FIG. 7).

The controller 30-1 controls the optical transmitter 20-1 to start outputting an optical signal (step S203 of FIG. 7). Thereby, the optical transmitter 20-1 starts outputting an optical signal at transmission light power P0 at the time point t12 of FIG. 8(A). The optical signal has the first transmission rate.

Next, the controller 30-1 is on standby until the standby time T1 elapses and determines whether the first response signal is received within the standby time T1 (step S204 of FIG. 7).

In this example, as illustrated in FIG. 8(A), the reception light power at the optical receiver 40-2 is smaller than the first standard at the time point t13 after the time point t12. Accordingly, the controller 30-2 determines "No" in the step S102 of FIG. 6, and comes to be on standby until the reception light power reaches the first standard. Consequently, the optical communication device 10-2 does not send the first response signal here.

For the above, the optical communication device 10-1 does not receive the first response signal within the standby time T1. Accordingly, the controller 30-1 determines "No" in step S204, and increases the transmission light power of an optical signal to be sent from the optical transmitter 20-1 by the first increment ΔP1 (step S205 of FIG. 7). Then the controller 30-1 returns to step S204 of FIG. 7.

After that, the controller 30-1 repeats steps S204-S205 of FIG. 7 and consequently, as illustrated in FIG. 8(A), the reception light power at the optical receiver 40-2 comes to be equal to or larger than the first standard at the time point t14.

Accordingly, the controller 30-2 determines "Yes" at the step S102 of FIG. 6 and obtains the SNR of each subcarrier contained in the optical signal received by the optical receiver 40-2 (step S103 of FIG. 6). The controller 30-2 determines the second increment ΔP2 based on the obtained SNRs and the retained data (step S104 of FIG. 6).

Next, the controller 30-2 controls the optical transmitter 20-2 to send the first response signal containing the determined second increment ΔP2 (step S105 of FIG. 6). Responsively, the optical transmitter 20-2 sends an optical signal containing the first response signal to the optical receiver 40-1.

Then, the controller 30-2 determines whether a confirmation signal from the optical communication device 10-1 has been received (step S106 of FIG. 6).

In the first embodiment, the optical communication device 10-1 does not receive the first response signal until the transmission light power of an optical signal to be sent from the optical transmitter 20-2 is controlled to be an appropriate value. In the illustrated example, the optical communication device 10-2 does not receive the confirmation signal from the optical communication device 10-1 at the time point t14 of FIG. 8.

Accordingly, the controller 30-2 determines "No" in step S106 of FIG. 6, and returns to step S105 to repeat the procedure of steps S105-S106.

Likewise, the same control on an optical signal to be sent through the transmission path 50-1 is performed on an optical signal to be sent through the transmission path 50-2. Accordingly, as illustrated in FIG. 8(B), after the optical transmitter 20-2 is started at the time point t22 subsequently to the starting of the optical receiver 40-1 at the time point t21, the reception light power at the optical receiver 40-1 comes to be equal to or more than the first standard at the time point t24.

As a result, at the time point t24, the optical receiver 40-1 receives the first response signal sent from the optical transmitter 20-2, which causes the controller 30-1 to determine "Yes" in step S204 of FIG. 7. Then the controller 30-1 increases the transmission light power of an optical signal to be sent from the optical transmitter 20-1 by the second increment ΔP2 contained in the first response signal at the time point t15 of FIG. 8(A) (step S206 of FIG. 7).

Then the controller 30-1 controls the optical transmitter 20-1 to send the confirmation signal (step S207 of FIG. 7). Responsively, the optical transmitter 20-1 sends an optical signal containing the confirmation signal to the optical receiver 40-2. Then the controller 30-1 determines whether the second response signal has been received from the optical communication device 10-2 (step S208 of FIG. 7).

The optical receiver 40-2 receives the confirmation signal sent from the optical transmitter 20-1, which consequently causes the controller 30-2 to determine "Yes" in step S106 of FIG. 6 and control the optical transmitter 20-2 to send the second response signal (step S107 of FIG. 6). Responsively, the optical transmitter 20-2 sends an optical signal containing the second response signal to the optical receiver 40-1.

Consequently, the optical receiver 40-1 receives the second response signal sent from the optical transmitter 20-2, which causes the controller 30-1 to determine "Yes" in step S208 of FIG. 7.

The procedure of steps S101-S107 of FIG. 6 and the procedure of steps S201-S208 of FIG. 7 may be referred to the transmission light power control.

After that, the controller 30-1 instructs the DMT modulator 21-1 to set the subcarriers contained in the transmitting subcarrier group to be used subcarriers while set the remaining subcarriers to be unused subcarriers. In addition, the controller 30-1 instructs the DMT modulator 21-1 to set the multilevel degrees of the subcarriers set to be the used subcarriers to the multilevel degree for multilevel degree control (step S209 of FIG. 7).

Consequently, the optical communication device 10-1 sends an optical signal to the optical communication device 10-2 through the transmission path 50-1 at the third transmission rate.

As described above, in the step S206 of FIG. 7, the optical transmitter 20-1 controls the power of an optical signal to be sent at the third transmission rate to the power corresponding to the SNR of an optical signal sent and received at the first transmission rate.

In spite of a change of the transmission rate of an optical signal from the first transmission rate to the third transmission rate, it is possible to control an optical signal that is to be input into the optical receiver 40-2 to have appropriate power. This makes it possible to rapidly accomplish the multilevel degree determination control.

Next, the controller 30-1 is on standby until receiving the third response signal from the optical communication device 10-2 ("No" route in step S210 of FIG. 7).

The controller 30-2 instructs the DMT demodulator 43-2 to set the subcarriers contained in the transmitting subcarrier group to be used subcarriers while set the remaining subcarriers to be unused subcarriers. In addition, the controller 30-2 instructs the DMT demodulator 43-2 to set the multilevel degrees of demodulation of the subcarriers set to be the used subcarriers to the multilevel degree for multilevel degree control (step S108 of FIG. 6).

Next, the controller 30-2 obtains the SNR of each subcarrier contained in the optical signal received by the optical receiver 40-2 (step S109 of FIG. 6). Then, the controller 30-2 determines a multilevel degree of each subcarrier on the basis of the obtained SNRs and the retained data (step S110 of FIG. 6).

After that, the controller 30-2 controls the optical transmitter 20-2 to send the third response signal containing the multilevel degrees of the respective subcarriers (step S111 of FIG. 6), which causes the optical transmitter 20-2 to send an optical signal containing the third response signal to the optical receiver 40-1.

Then, the controller 30-2 instructs the DMT demodulator 43-2 to set the multilevel degrees of demodulation of the respective subcarriers set to be the used subcarriers to the determined multilevel degrees (step S112 of FIG. 6), and finishes the procedure of FIG. 6.

The optical receiver 40-1 receives the third response signal sent from the optical transmitter 20-2, which causes the controller 30-1 to determine "Yes" in step S210. Next, the controller 30-1 instructs the DMT modulator 21-1 to set the multilevel degrees of modulation of the subcarriers set to be the used subcarriers to the multilevel degrees contained in the third response signal (step S211 of FIG. 7), and finishes the procedure of FIG. 7.

The procedure of step S108-S112 of FIG. 6 and the procedure of step S209-S211 of FIG. 7 may be referred to the multilevel degree determination control.

After that, the optical communication device 10-1 sends an optical signal to the optical communication device 10-2 through the transmission path 50-1 at the second transmission rate.

As described above, the optical communication system 1 carries out the same control on an optical signal to be sent through the transmission path 50-1 also on an optical signal to be sent through the transmission path 50-2. After that, the optical communication device 10-2 sends an optical signal to the optical communication device 10-2 through the transmission path 50-2 at the second transmission rate.

As detailed above, the optical transmitter 20-$i$ according to the first embodiment controls the transmission rate of an optical signal to the first transmission rate corresponding to the first reception light power lower than the target reception light power of the optical receiver 40-$j$ in response to the transmission light power control for the optical signal corresponding to the target reception light power.

In the transmission light power control, this can shorten the time taken until the power of an optical signal that is to be input into the optical receiver 40-$j$ reaches the receivable power at which the optical receiver 40-$j$ is able to receive the optical signal, and it is thereby possible to shorten time to establish optical communication between the optical transmitter 20-$i$ and the optical receiver 40-$j$.

In the optical communication system 1 of the first embodiment, an optical signal is modulated in a multicarrier modulation scheme. Besides, in the optical communication system 1, an optical signal to be sent at the first transmission rate contains less subcarriers than subcarriers contained in an optical signal to be sent at the second transmission rate corresponding to the target reception light power. In addition, the optical signal to be sent at the second transmission rate contains a subcarrier having a frequency higher than frequencies of the subcarriers contained in the optical signal to be sent at the first transmission rate.

A subcarrier having a lower frequency provides higher communication quality. Accordingly, the optical communication system 1 is capable of enhancing the communication quality of an optical signal to be sent at the first transmission rate, so that the time for establishing optical communication between the optical transmitter 20-$i$ and the optical receiver 40-$j$ can be shorten.

The optical communication system 1 of the first embodiment changes the transmission rate by changing both the number of subcarriers set to be used subcarriers and the multilevel degree. Alternatively, the optical communication system 1 may change the transmission rate by changing either one of the number of subcarriers set to be used subcarriers or the multilevel degree and not changing the other one.

The optical communication system 1 of the first embodiment sends and receives both the confirmation signal and the second response signal. Alternatively, the optical communication system 1 may send and receive either one of the confirmation signal or the second response signal and may omit sending and receiving the other signal. Alternatively, the optical communication system 1 may omit sending and receiving the confirmation signal and the second response signal.

The optical communication system 1 of the first embodiment performs the transmission light power control on an optical signal to be sent through the transmission path 50-1 and an optical signal to be sent through the transmission path 50-2. Alternatively the optical communication system 1 may perform the transmission light power control on either one of an optical signal to be sent through the transmission path 50-1 or an optical signal to be sent through the transmission path 50-2 and not on the other signal.

In the optical communication system 1 of the first embodiment, the optical communication device 10-$i$ receives, from the counterpart optical communication device 10-$j$, data (e.g., the second increment and the multilevel degree) determined on the basis of an optical signal that the optical communication device 10-$j$ has received. Alternatively, the optical communication device 10-$i$ may use data determined on the basis of an optical signal that the optical communication device 10-$i$ has received in place of the data determined on the basis of an optical signal that the counterpart optical communication device 10-$j$ has received. This configuration can suppress the load for sending the above data from the optical communication device 10-$j$ to the optical communication device 10-$i$.

For example, in cases where the length of the transmission path 50-1 comes closer to that of the transmission path 50-2, the transmission property of the transmission path 50-1 also comes closer to that of the transmission path 50-2. Accordingly, in cases where the length of the transmission path 50-1 is adequately close to that of the transmission path 50-2, the data determined on the basis of an optical signal that the counterpart optical communication device 10-*j* has received is substantially similar to the data determined on the basis of an optical signal that the optical communication device 10-*i* has received. For the above, the optical communication device 10-*i* can correctly carry out the control using the data determined on the basis of an optical signal that the optical communication device 10-*i* has received.

According to the disclosure, optical communication between an optical transmitter and an optical receiver can be rapidly established.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical communication system comprising:
   an optical transmitter that sends an optical signal; and
   an optical receiver that receives the optical signal, wherein
   the optical transmitter includes a controller programmed to perform transmission light power control, the transmission light power control including:
   setting a transmission rate of the optical signal to a first transmission rate;
   increasing power of the optical signal output at the first transmission rate
   from the optical transmitter until a target power is reached which corresponds to a power of the optical signal being input into the optical receiver is equal to or more than a minimum receivable light power, the minimum receivable light power representing the minimum value of power of the optical signal that the optical receiver can receive; and
   completing the transmission light power control based on a response signal from the optical receiver; and
   the controller programmed to increase the transmission rate to a second transmission rate larger than the first transmission rate after completion of the transmission light power control.

2. The optical communication system according to claim 1, wherein:
   the optical transmitter modulates the optical signal in a multicarrier modulation scheme; and
   the optical signal sent at the first transmission rate contains fewer subcarriers than subcarriers contained in the optical signal sent at the second transmission rate.

3. The optical communication system according to claim 2, wherein the optical signal sent at the second transmission rate contains a subcarrier having a frequency higher than frequencies of the subcarriers contained in the optical signal sent at the first transmission rate.

4. The optical communication system according to claim 1, wherein the optical transmitter modulates the optical signal sent at the first transmission rate to have a multilevel degree lower than a multilevel degree of the optical signal sent at the second transmission rate.

5. The optical communication system according to claim 1, wherein:
   the optical transmitter modulates the optical signal in a multicarrier modulation scheme; and
   the controller controls the transmission rate of the optical signal to a third transmission rate in a multilevel degree determination control, the third transmission rate being lamer than the first transmission rate and smaller than the second transmission rate, the multilevel degree determination control determining a multilevel degree of modulation for each of subcarriers contained in the optical signal.

6. The optical communication system according to claim 5, wherein the controller controls power of the optical signal sent at the third transmission rate to power corresponding to a signal to noise ratio of the optical signal sent at the first transmission rate and received by the optical receiver.

7. The optical communication system according to claim 1, the transmission light power control gradually increases power of the optical signal that is sent.

8. A method for controlling optical communication in an optical transmitter that sends an optical signal to an optical receiver, the method comprising:
   at the optical transmitter performing transmission light power control, the transmission light power control including:
   setting a transmission rate of the optical signal to a first transmission rate a transmission light power control;
   increasing power of the optical signal output at the first transmission rate from the optical transmitter until a target power is reached which corresponds to a power of the optical signal being input into the optical receiver is equal to or more than a minimum receivable light power,
   the minimum receivable light power represents the minimum value of power of the optical signal that the optical receiver can receive; and
   completing the transmission light power control based on a response signal from the optical receiver, and
   the optical transmitter, after the transmission light power control, increasing the transmission rate to a second transmission rate larger than the first transmission rate.

9. The method according to claim 8, further comprising at the optical transmitter,
   modulating the optical signal in a multicarrier modulation scheme, wherein
   the optical signal sent at the first transmission rate contains fewer subcarriers than subcarriers contained in the optical signal sent at the second transmission rate.

10. The method according to claim 9, wherein the optical signal sent at the second transmission rate contains a subcarrier having a frequency higher than frequencies of the subcarriers contained in the optical signal sent at the first transmission rate.

11. The method according to claim 8, further comprising at the optical transmitter,
    modulating the optical signal sent at the first transmission rate to have a multilevel degree lower than a multilevel degree of the optical signal sent at the second transmission rate.

12. An optical transmitter that sends an optical signal to an optical receiver, the optical transmitter comprising:
    a controller programmed to perform transmission light power control, the transmission light power control including:
    setting a transmission rate of the optical signal to a first transmission rate;
    increasing power of the optical signal at the first transmission rate from the optical transmitter until a target power is reached which corresponds to a power of the optical signal being input into the optical receiver is equal to or more than a minimum receivable light power, the minimum receivable light power representing the minimum value of power of the optical signal that the optical receiver can receive; and completing the transmission light power control based on a response signal from the optical receiver; and the controller programmed to increase the transmission rate to a second transmission rate larger than the first transmission rate after completion of the transmission light power control.

13. The optical transmitter according to claim 12, wherein:

the optical transmitter modulates the optical signal in a multicarrier modulation scheme; and the optical signal sent at the first transmission rate contains fewer subcarriers than subcarriers contained in the optical signal sent at the second transmission rate.

14. The optical transmitter according to claim 13, wherein the optical signal sent at the second transmission rate contains a subcarrier having a frequency higher than frequencies of the subcarriers contained in the optical signal sent at the first transmission rate.

15. The optical transmitter according to claim 12, wherein the optical transmitter modulates the optical signal sent at the first transmission rate to have a multilevel degree lower than a multilevel degree of the optical signal sent at the second transmission rate.

* * * * *